United States Patent [19]

Thomas et al.

[11] 4,050,327
[45] Sept. 27, 1977

[54] FAST-MAKE CONNECTION FOR A PUSH-PULL CONTROL CABLE ASSEMBLY

[75] Inventors: Robert J. Thomas, Kent; Marvin H. Jones, Ravenna, both of Ohio

[73] Assignee: Samuel Moore and Company, Mantua, Ohio

[21] Appl. No.: 560,582

[22] Filed: Mar. 21, 1975

[51] Int. Cl.² .......................... F16C 1/12; F16C 1/14; F16C 1/16
[52] U.S. Cl. ............................................ 74/502; 24/223; 403/316; 403/353
[58] Field of Search ............ 74/502, 503, 504, 501 R; 403/315, 316, 353; 24/223; 292/19

[56] References Cited

U.S. PATENT DOCUMENTS

| | | | |
|---|---|---|---|
| 2,449,167 | 9/1948 | Hopewell | 403/315 X |
| 2,899,836 | 8/1959 | Cushman et al. | 74/502 |
| 3,237,977 | 3/1966 | Batchelder | 74/502 X |
| 3,395,592 | 8/1968 | Houk | 74/502 |
| 3,405,567 | 10/1968 | Houk | 74/502 |
| 3,643,523 | 2/1972 | Mihaila | 74/502 |

*Primary Examiner*—Samuel Scott
*Assistant Examiner*—F. D. Shoemaker
*Attorney, Agent, or Firm*—Hamilton, Renner & Kenner

[57] ABSTRACT

A connector to provide a fast-make coupling by which releasably to interconnect a control device to a push-pull control cable assembly. The control device has at least a sheath member and a plunger movable longitudinally within a passage through the sheath member. A connector housing is substantially permanently secured to the casing of the push-pull control cable assembly and releasably attached to the sheath member so as to be longitudinally aligned with the passageway therein. A shuttle plug, which is secured to the core of the push-pull control cable assembly is slidably received within the connector housing and the passageway in the sheath member to which the connector housing is releasably attached. A lug is presented from the plunger and interacts with a socket in the shuttle plug to effect an interconnection that is readily engaged and released, but only when the connector housing is not attached to the sheath member.

5 Claims, 6 Drawing Figures

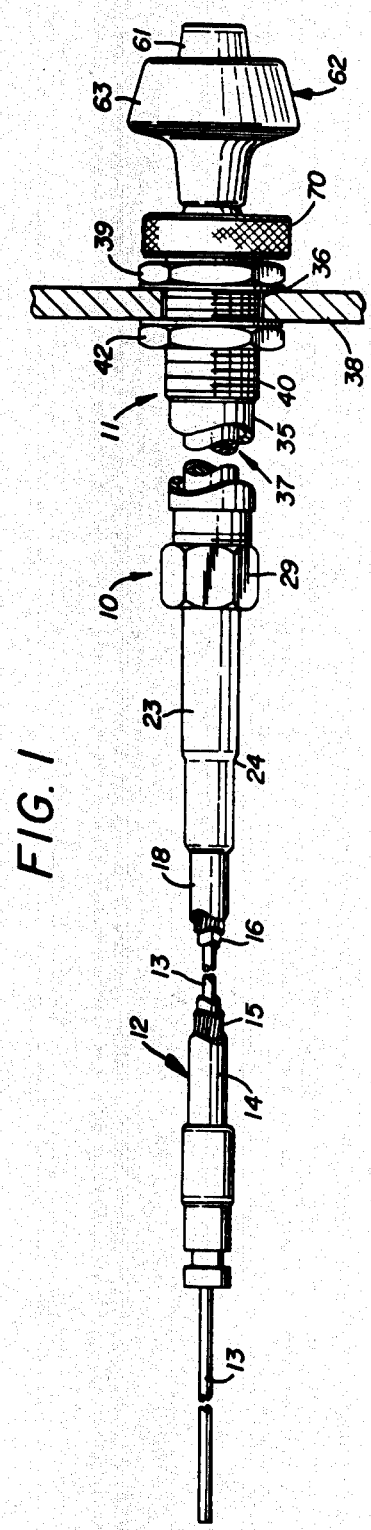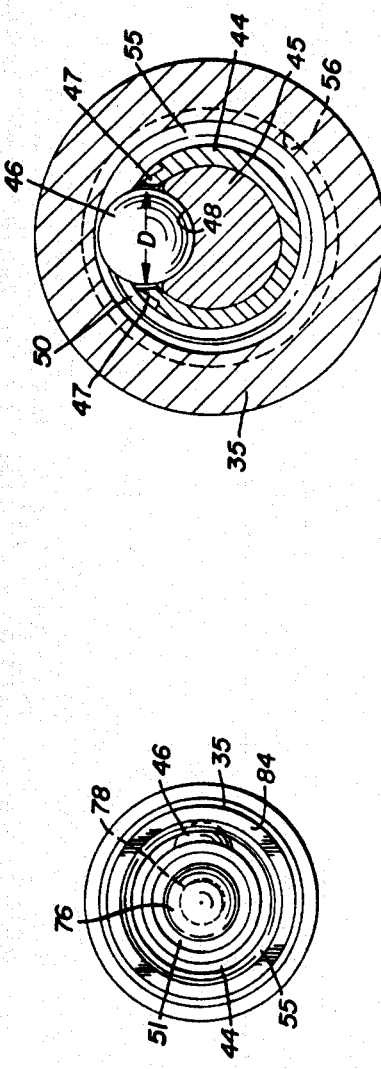

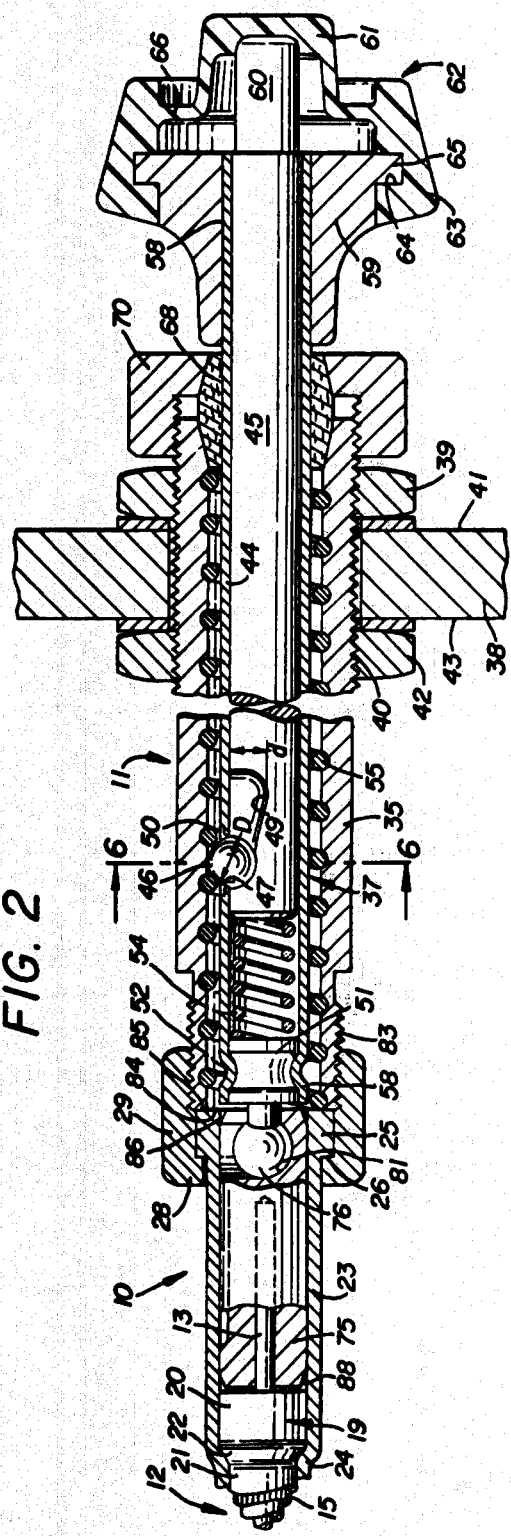
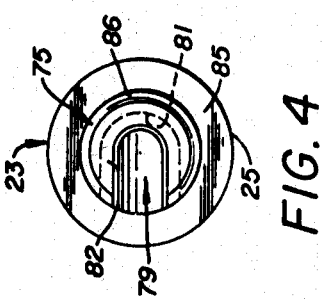
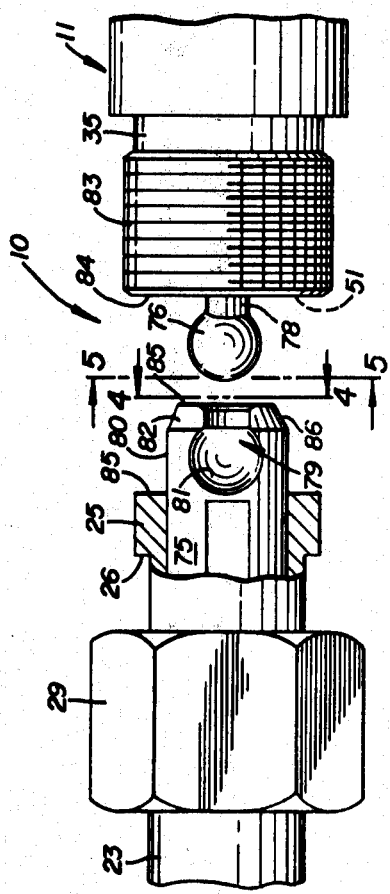

FAST-MAKE CONNECTION FOR A PUSH-PULL CONTROL CABLE ASSEMBLY

BACKGROUND OF THE INVENTION

The present invention relates generally to the interconnection of control devices and push-pull control cable assemblies. As such, the present invention relates to the interconnection by which a control device actuates the core of a push-pull control cable assembly with respect to the casing thereof. Specifically, the present invention relates to an improved construction for selectively connecting and disconnecting a control device to the core and casing of a push-pull control cable assembly.

Although the prior art shows many constructions for push-pull control cable casings, one of the most suitable constructions, and one which assures greatest flexibility and efficiency, comprises a plurality of wires laid contiguously in a long pitch helix around the outer periphery of a plastic tube, or liner. The helically arranged wires of the casing are maintained in their proper position solely by a plastic cover in the smaller cable and by a reinforcing, spread helix of wire or flat metallic ribbon, in conjunction with the plastic cover, in larger cables.

The plastic tube which comprises the innermost element of the cable casing acts as a bearing for the core of the cable which is slidable within the casing and also acts to protect the casing wires from the elements having access to the interior of the tube. The plastic cover, which comprises the outermost element of the cable casing, not only acts as a structural member to retain the casing wires in their helically coiled configuration but also acts as a protective member to shelter the wires from the exterior elements.

In push-pull control cable installations the ends of the casing are generally clamped in position by end fittings which are either swaged or clamped onto the cable casing. An attaching means is generally provided on the fittings for attaching the casing to an anchoring point.

Normally, an extension tube is swivally mounted to the fitting and the extension tube slidably receives an end rod which has been swaged, or otherwise substantially permanently connected, to the core. As such, the prior art connection between the push-pull control cable assembly and the mechanism which operates, or is operated by, the push-pull control cable is not subject to facile assembly or disassembly once the control device is joined to the push-pull cable assembly, the connection is relatively permanent. Moreover, the type connection heretofore employed generally requires more sophisticated equipment than is generally available for on-the-spot, field installations.

The substantially permanent nature of the prior art connection between a control device — either the device which controls or the device which is controlled — and its associated push-pull control cable assembly required that the rather expensive control devices be stocked in conjunction with a variety of push-pull control cable lengths in order to satisfy various installation requirements. Such an arrangement also required that the conjoined control device and push-pull control cable both be removed and installed simultaneously. This, of course, was a major drawback when only one or the other required replacement. Moreover, the direction in which the push-pull control cable assembly was installed was determined by the mounting requirements of the control device attached thereto. For example, if a control device was to be mounted through an opening in a relatively fixed assembly, such as a panel or dash, the entire push-pull cable assembly had to be threaded through the opening in order to mount the control device therein.

SUMMARY OF THE INVENTION

It is, therefore, a primary object of the present invention to provide an improved means for interconnecting a control device to a push-pull control cable assembly.

It is another object of the present invention to provide an improved connector, as above, which permits facile field assembly and disassembly between the control device and the push-pull control cable assembly.

It is a further object of the invention to provide an improved connector, as above, that accommodates relative rotation between the core of the push-pull control cable assembly and that element of the control device to which it is releasably secured.

These and other objects, together with the advantages thereof over existing and prior art forms which will become apparent from the following specification, are accomplished by means hereinafter described and claimed.

In general, a connector embodying the concept of the present invention is adapted to provide a fast-make coupling between a push-pull control cable assembly and the control device. Push-pull control cable assemblies employ a core that is axially slidable within a casing to transmit motion. A control device must be attached to the push-pull control cable assembly to impart relative motion between the core and casing or to receive such motion.

A typical control device employs at least a plunger means that moves axially within the passageway of a sheath member. The control device is also provided with means to move, or be moved by, the plunger means. To interconnect such a control device to the push-pull control cable assembly one end of a tubular connector housing is secured to the casing in a substantially permanent manner. The other end of the control housing is releasably secured to the sheath member of the control device such that the passageway in the sheath member is axially aligned with the tubular connector housing.

A shuttle plug is fixedly secured to the core of the push-pull control cable assembly and is reciprocable within the tubular connector housing and the aligned passageway within the sheath member. A releasable interconnection is also provided between the shuttle plug and the plunger means in the control device. Specifically, a lug is presented from the plunger means that is rotatably received within a socket in the shuttle plug. The lug is inserted or removed from the socket through a transverse opening or slot extending radially of the shuttle plug so that the lug can be inserted or removed therethrough only when the connector housing is disconnected from the sheath of the control device and when the lug is positioned exteriorly with respect to the sheath member of the control device.

One preferred embodiment of a connector incorporating the concept of the present invention is shown by way of example in the accompanying drawings and described in detail without attempting to show all of the various forms and modifications in which the invention might be embodied; the invention being measured by the appended claims and not by the details of the specification.

DESCRIPTION OF THE DRAWINGS

FIG. 1 is a side elevation of a push-pull control cable assembly, partly broken away, that is secured to a vernier control device by an arrangement that embodies the concept of the present invention;

FIG. 2 is an enlarged longitudinal section through the interconnected vernier control device and the push-pull control cable assembly depicted in FIG. 1;

FIG. 3 is a further enlarged side elevation of the structural components by which the improved interconnection between the vernier control device and the push-pull control cable assembly is effected;

FIG. 4 is an end elevation of one of the structural components effecting said interconnection and taken substantially on line 4—4 of FIG. 3;

FIG. 5 is an end elevation of the interconnecting structural component that matingly engages the component depicted in FIG. 4, said elevation being taken substantially along line 5—5 of FIG. 3 and appearing on the same sheet of drawings as FIG. 1; and, FIG. 6 is an enlarged, transverse section taken substantially along line 6—6 of FIG. 2 and also appearing on the same sheet of drawings as FIG. 1.

DESCRIPTION OF A PREFERRED EMBODIMENT

Referring more particularly to the drawings, the improved interconnection, designated generally by the numeral 10, is depicted as being used operatively to secure a vernier control 11 to a push-pull control cable assembly 12.

The push-pull control cable assembly 12 includes a core 13 and a casing 14 in which the core 13 is reciprocably slidable. The prior art is replete with numerous casing constructions, one of which is depicted environmentally herein and comprises a plurality of wires 15 contiguously laid in the form of a relatively long pitch helical coil about the radially outer surface of the inner, flexible tube 16 which extends the full length of the casing 14. An outer, flexible cover 18 encases the coil of wires 15 and extends along the entire casing to within a short distance from the end of the wires. An anchor fitting 19 is fitted over the end of the wires 15 and is securely attached thereto, as by swaging.

The anchor fitting 19 preferably presents a cylindrical outer end portion 20 of greater diameter than the diameter of the sleeve-like body portion 21 which is secured to the wires 15 of casing 14. An inclined transitional shoulder 22 flares outwardly from the body portion 21 and terminates at the outer end portion 20. The mouth of a tubular connector housing 23 is necked down over the transitional shoulder, as at 24, to secure the housing 23 to the fitting 19. The opposite end of the housing 23 terminates in a lip 25 which presents a radial shoulder 26 for engaging the stop flange 28 on a coupling nut 29, the purpose for which is hereinafter more fully explained.

Turning now to the vernier control 11 it is housed in a tubular sheath member 35 that may be positioned to extend through a suitable opening 36, for example, on an instrument panel 38 by supplying a radially directed shoulder means such as is provided by the first mounting nut 39 received on the threaded shank portion 40 of the sheath member 35. The first mounting nut 39 operatively engages the front face 41 of the panel 38, and a second mounting nut 42 may be tightened against the rear face 43 of the panel 38 to secure the vernier control 11 in position.

Slidably received within the tubular sheath 35 is a plunger means 37 that incorporates control sleeve 44 which, in turn, embraces an operating rod 45. The control sleeve 44 and operating rod 45 can be rotated only in unison but are axially movable with, and to a predetermined degree with respect to, each other. This duality of motion allows the operator to determine whether movement of the plunger means 37 is to be accomplished in gross or with precision and may be accomplished by employing a thrust ball 46.

As best seen in FIG. 2, the thrust ball 46 is received in an axially extending cavity 48, the radially innermost wall of which presents an inclined camming surface 49. The thrust ball 46 also extends outwardly through, and is retained by, the rim 47 of a radial aperture 50 through the control sleeve 44.

A plug 51 is secured, as by the roll crimp 52, within the inboard end 58 of the control sleeve 44, and a spring 54 is interposed between the plug 51 and the operating rod 45 to bias the operating rod axially outwardly with respect to the control sleeve 44.

Because the greatest depth "d" of the cavity 48 is of lesser dimension than the diameter "D" of the thrust ball 46, the interaction of the thrust ball 46 with the aperture 50 restricts the axial movement of the operating rod 45 within the control sleeve 44 to the axial extent through which the thrust ball 46 can move within the cavity 48. By the same token, this interaction of the thrust ball 46 with the aperture 50 limits the extent to which the operating rod 45 can be translated as a result of the biasing pressure applied thereto by the spring 54.

By making the circumferential dimension of the cavity 48 substantially equal to the diameter "D" of the thrust ball 46, the thrust ball forces the control 44 and operating rod 45 to rotate only in unison but permits the operating rod 45 to move axially with respect to the control sleeve 44, as described above.

The camming action applied to the thrust ball 46 by the cam surface 49 of recess 48 under the biasing pressure of the spring 54 drives the thrust ball 46 to its radially outermost position with respect to the aperture 50 where it engages a thread means provided on the interior surface of the tubular control sleeve 44.

The thread means depicted comprises a helically wound coil of polished wire 55 which is seated in a helical groove 56. Because the wire 55 presents a helically extending ridge of semicircular cross section, the thrust ball 46 will roll, or slide, easily into a position between successive wraps of the helical wind even though the thrust ball may have initially contacted the radially innermost portion of the ridge presented by the wire 55.

The end 58 of the control sleeve 44 opposite to the plug 51 extends outwardly of the sheath member 35 and has a primary control knob 59 fixedly mounted thereon. The operating rod 45 extends outwardly beyond the primary control knob 59 and terminates in a secondary control knob, or button, 60.

The nave portion 61 of a cap 62 is secured to the secondary control button 60 and the radially inner edge on the skirt portion 63 of the cap 62 has an annular groove 64 by which to engage a circumferential flange 65 on the primary control knob 59 and secure it thereto. A flexible web 66 extends between the nave portion 61 and the skirt portion 63 so that the operating rod 45 can be axially translated against the biasing action of the spring 54 upon application of pressure to the nave portion 61, as by an operator's thumb.

When one thus depresses the nave portion 61 of the cap 62 to move the operating rod 45 axially with respect to the control sleeve 44 the deepest portion of the cavity 48 is moved beneath the thrust ball 46 allowing it to retract radially inwardly with respect to the aperture 50 and thereby disengage from the wire forming the thread means 55. With the thrust ball 46 thus disengaged from the thread means the primary control knob 59 can be moved in or out to effect gross movement of the control sleeve 44.

As soon, however, as the depressing force is removed from the nave portion 61 of the cap 62 the spring 54 translates the operating rod 44 axially outwardly with respect to the control sleeve 45 causing the camming surface 49 to force the thrust ball 46 radially outwardly through the aperture 50 to the extent that it engages the thread means 55. The interengagement of the thrust ball 46 with the thread means 55 precludes gross movement of the control sleeve 44, but the primary control knob 59 may be rotated to effect precise, accurate, axial displacement of the control sleeve — i.e., vernier control. When the control sleeve 44 is thus rotated the interaction of the thrust ball 46 with both the aperture 50 and the recess 48 causes the operating rod 45 to rotate concurrently with the control sleeve 44.

It is quite customary to provide vernier controls with means for variably adjusting the sliding friction of the control sleeve 44 with respect to the sheath 35. Typical of such means is the use of packing material 68 within a conical stuffing recess 69 provided in the outermost end of the sheath member 35 and variably compressible against the control sleeve 44 by a gland 70.

In order to transfer the motion of the control sleeve 44 to the push-pull control cable, the core 13 is secured to a shuttle plug 75 that is slidably received within the connector housing. The shuttle plug 75 is, in turn, connected to the control sleeve 44 in such a way as to permit relative rotation therebetween. As such, the primary control knob 59 may be rotated to effect vernier control without twisting the core 13.

Specifically, a connector lug, either in the form of a circular disc or a ball 76, as shown, is secured in spaced relation to the plug 51 by an axially extending stub shaft 78, and the lug 76 is rotatably received within the shuttle plug 75. As is perhaps best seen from FIGS. 3 and 4, an opening, or slot, 79 extends radially inwardly from the peripheral edge 80 of the shuttle plug 75 and terminates in a semi-spherical recess, or socket, 81 beneath the radially inwardly directed retaining flange 82.

With the connector lug 76 received within the socket 81, the shuttle plug 75 may be axially aligned with the control sleeve 44, and because the diameter of the shuttle plug 75 is substantially equal to the diameter of the control sleeve 44, the shuttle plug 75 will then be axially translatable within the sheath member 35 as well as within the connector housing 23. Because the shuttle plug 75 slidably engages the interior of the connector housing 23 and the sheath member 35, the unsupported length of the core 13 tends to be minimized, thereby permitting the interconnection 10 to be as well adapted to the transmission of compressive forces as tensile forces.

Threads 83 are provided on the exterior of the sheath member 35 adjacent the axially inner end face 84 thereof. The threads 83 are engageable by the coupling nut 29 in order to secure the end face 85 of the connector housing 23 into abutting contact with the conforming end face 84 of the sheath 35.

To couple, or uncouple, the connector 10 the connector housing 23 must be released from the sheath member 35 by removing the coupling nut 29 from the threads 83 on the sheath member 35. Only when the connector housing 23 is thus disconnected from the sheath member 35 and only when the lug 76 is positioned axially outwardly the confines of the sheath member 35, as shown in FIG. 3, may the shuttle plug 75 be moved transversely with respect to the sheath member sufficiently to engage, or disengage, the lug 76 from the socket 81 through the radial slot 79.

This effects a facile coupling arrangement that is precluded as soon as the shuttle plug is confined within the connector housing and/or the sheath member with the lug received in the socket.

The provision of conical aligning chamfers 86 and 88 around the radially outer periphery on each end of the shuttle plug 75 facilitates the axial translation of the shuttle plug 75 between the interior of the connector housing 23 and the interior of the sheath member 35 in response to either gross or vernier translation of control sleeve 44 by appropriate actuation of the primary and secondary control knobs 59 and 60. This, in turn, accomplishes translation of the core 13 relative to the casing 14.

In view of the foregoing description it should now be apparent that the concept of the present invention provides a novel and unique means by which releasably to effect an operative interconnection between a push-pull control cable assembly and a control device and otherwise accomplishes the objects of the invention.

What is claimed is:

1. A connector for operatively securing a push-pull cable assembly having a core reciprocably slidable in a casing to a control device having at least a sheath member and a plunger means movable longitudinally in the sheath member, a connector housing secured to the push-pull cable casing, means releasably securing said connector housing to the sheath member, a shuttle plug fixedly secured to the push-pull cable core and reciprocably slidable within said connector housing and the sheath member releasably secured thereto, lug means presented from the plunger means, and means in the shuttle plug releasably to engage said lug means and permit relative rotation therebetween.

2. A connector, as set forth in claim 1, in which a radially opening slot is incorporated in said shuttle plug, said lug means being releasably received within said radially opening slot.

3. A connector, as set forth in claim 2, in which said lug means comprises a ball secured to and positioned in axially spaced relation with respect to the plunger means.

4. A connector, as set forth in claim 3, in which said radially opening slot terminates in a semi-spherical socket, said ball being rotatably received within said socket.

5. a connector, as set forth in claim 4, in which an annular anchor fitting is secured to said cable casing, said connector housing having opposite ends, one end thereof being mounted on said anchor fitting, a radially outwardly directed lip presented from the other end of said connector housing, a coupling nut being carried on said connector housing and engaging said lip, said coupling nut releasably mounting said connector housing to the sheath member of the control device.

* * * * *